United States Patent [19]

Nickel et al.

[11] Patent Number: 4,774,096

[45] Date of Patent: Sep. 27, 1988

[54] NOVEL FIBROUS PRODUCT

[75] Inventors: Gary B. Nickel; George D. Richardson, both of Manitoba, Canada

[73] Assignee: Woodstone Foods (1987) Limited, Manitoba, Canada

[21] Appl. No.: 888,416

[22] Filed: Jul. 23, 1986

[51] Int. Cl.$^4$ .................... A23L 1/20; A23L 1/227
[52] U.S. Cl. .................... 426/253; 426/258; 426/261; 426/259; 426/634; 426/629; 426/467; 426/469; 426/471; 127/37
[58] Field of Search ............... 426/634, 467, 469, 629, 426/640, 473, 658, 464, 258, 259, 459, 261, 431, 804; 127/34, 37; 162/80, 87, 99; 536/56

[56] References Cited

U.S. PATENT DOCUMENTS

| | | | |
|---|---|---|---|
| 3,573,061 | 3/1971 | Glabe et al. | 426/804 |
| 3,767,423 | 10/1973 | Tsantir et al. | 426/804 |
| 4,241,093 | 12/1980 | Farag | 426/259 |
| 4,307,121 | 12/1981 | Thompson | 426/634 |
| 4,376,130 | 3/1983 | Astrack et al. | 426/261 |
| 4,486,459 | 12/1984 | Thompson | 426/634 |
| 4,599,240 | 7/1986 | Thompson | 426/634 |

FOREIGN PATENT DOCUMENTS

| | | | |
|---|---|---|---|
| 1048848 | 2/1979 | Canada . | |
| 1111708 | 3/1981 | Canada . | |
| 1102614 | 9/1981 | Canada . | |
| 1118270 | 6/1982 | Canada . | |
| 0072852 | 6/1978 | Japan | 426/261 |
| 0021550 | 2/1981 | Japan | 426/261 |
| 0001208 | 1/1982 | Japan | 426/261 |

*Primary Examiner*—Jeanette Hunter
*Attorney, Agent, or Firm*—Bernard, Rothwell & Brown

[57] ABSTRACT

A process for the preparation of a fibrous natural product comprising agitating an aqueous slurry of ground material from the outer seed coat of a legume, especially yellow or green field peas, to dissolve only water-soluble protein and sugar products, filtering the slurry and drying the solid product thus obtained to provide a novel fibrous natural product. The latter is useful as an additive for edible food products such as bread, muffins and pasta to increase the fibrous content thereof.

40 Claims, No Drawings

NOVEL FIBROUS PRODUCT

This invention relates to novel improved fibrous natural products and more particularly it relates to novel improved fibrous natural products which are prepared from legumes such as peas and beans. These novel products are useful as additives to edible food products such as bread, muffins and pasta.

It is known from Canadian Patent No. 1,111,708, issued Nov. 3, 1981, that a fibrous product containing pea fibres can be obtained from the hulls of green field peas and such pea fibres have particle sizes in the range which pass a 20 mesh screen but do not pass an 80 mesh screen (U.S. Standard) Sieve). Particularly preferred pea fibres have particle sizes which pass a 20 mesh screen but do not pass a 60 or 40 mesh screen, referred to as −20+60 or −20+40, respectively, mesh particles. It is also known from Canadian Patent No. 1,048,848, issued Feb. 20, 1979, that a related fibrous product containing pea fibres can be obtained from yellow field peas. The pea fibres described in this known art were obtained from commercially available pea hulls solely by selection of particular particle sizes and without any treatment of the hulls.

We have now found, and herein lies our invention, that the hulls of legumes, which we prefer to name as the outer seed coat of legumes, such as peas and beans, can be purified by our novel process to provide novel improved fibrous natural products.

We have named or described our novel fibrous natural products obtained from the process of our invention as concentrated pea bran when prepared from the outer seed coat of peas.

The invention, as claimed herein, is a process for the preparation of a novel improved fibrous natural product which comprises agitating an aqueous slurry of ground material from the outerseed coat of a legume to dissolve water-soluble products, filtering said slurry and drying the solid product thus obtained to provide a novel fibrous natural product.

According to a further feature of the invention, as claimed herein, we provide a process for the preparation of a novel improved fibrous natural product which comprises grinding material from the outer seed coat of a legume to a requisite particle size, forming an aqueous slurry of the ground material and agitating said slurry to dissolve water-soluble products, filtering said slurry and drying the solid product to provide a novel fibrous natural product.

In yet a further feature of the invention, as claimed herein, we provide a process for the preparation of a novel improved fibrous natural product which comprises agitating an aqueous slurry of ground material from the outer seed coat of a legume to dissolve water-soluble products, filtering said slurry, suspending the solid material in water to form a second aqueous slurry and treating said second slurry with an oxidizing or bleaching agent, filtering said second slurry and drying the solid product to provide a novel fibrous natural product.

The material to be used as starting material in the process of this invention is the outer seed coat of the legume. Legumes which are suitable for use in this inventive process are peas and beans such as yellow or green field peas, white beans, navy beans and soya beans. The crop, such as yellow or green field peas, is usually field dried prior to harvesting and during that time the outer seed coat may become contaminated with soil and sand and perhaps soil borne bacteria. It is desirable to remove this contaminating material in order to provide final products in the form of powders having a high level of dietary fibre, being substantially bland in flavour and which can be added to food products to increase dietary fibre levels without significantly detracting from the flavour or texture of the food products.

The outer seed coat or skin of peas is a preferred starting material. The outer seed coat of peas is made up of an outer layer of palisade cells, a layer of hourglass cells, smaller parenchyma cells, aleurone cells and, finally, compressed layers of endosperm cells. The internal or remaining portion of the seed is generally referred to as the meat.

The raw starting material is generally in the form of whole or complete half pea shapes (split hollow spheres or rough hollow hemispheres) of the outer seed coat or skins of the pea seed mixed with fragments of spheres and pea cotyledon chips or broken powder-like particles. This raw starting material is available from manufacturers or processors of split peas who process the pea seeds by splitting the seeds to remove the outer seed coat or skin and retain only the residual internal portion of the seed in the form of split peas (meat). If necessary, the raw starting material may be passed over a gravity type separator in order to separate the denser pea cotyledon chips and other particles from the lighter, less dense outer seed coat pieces. After such a gravitational separation treatment, the outer seed coat is low in density, fluffy in texture and fairly light in colour.

It is to be understood that the sizes of mesh screens referred to throughout this specification are to be interpreted as U.S. standard screen sizes. Thus, for example, 30 to 60 mesh screen size refers to sieve openings of 590 microns to 250 microns, an 80 mesh screen size refers to a sieve opening of 177 microns, a 150 mesh screen size refers to a sieve opening of 104 microns and a 325 mesh screen size refers to a sieve opening of 44 microns.

In order to increase the surface area of the outer seed coat starting material so as to effectively dissolve and remove undesirable components during the process, the dry cleaned outer seed coat may be reduced in size, for example, by means of a grinder. An air swept pulverizer or hammer mill may preferably be used to grind the outer seed coat to a powder. The impact of the hammers or beaters affects the components of the outer seed coat starting material to different degrees. The pure outer seed coat itself is somewhat difficult to grind because of its fibrous nature whereas any pea cotyledon chips present are more readily reduced to a fine powder. The ground outer seed coat material may then be separated by means of a cascading screening system. Initially, the ground outer seed coat material may be sifted over vibratory screens or centrifugal screens using a 150 mesh screen to separate the finer powder, referred to as pea flour, from the larger particle size powder. This pea flour contains varying amounts of fibre and protein depending upon the moisture content of the outer seed coat starting material and the settings of the grinder.

This pea flour may be used for treatment according to the process of this invention to provide a novel fibrous natural product.

On the other hand, ground outer seed coat material having different particle sizes may also be used in the process of this invention. Thus, for example, ground outer seed coat material which passes through a 60 mesh screen is very suitable for use in the process of this invention. Relatively tough cellulosic fibrous material from the outer seed coat tends to remain on a 60 mesh screen whereas softer fibres having higher contents of hemicellulose, pectins and gums are more readily ground and tend to pass through a 60 mesh screen. The actual particle size of the outer seed coat starting material may be varied according to the type of fibrous natural product which it is desired to produce. The seed coat material passing through a 100 mesh screen or a 150 mesh screen, to be used as starting material for the process of this invention, the softer the fibrous natural product will be which is prepared therefrom and such a product tends to be characterized by having a high water absorption. When the ground outer seed coat used as starting material is a powder having larger particle sizes, such as a powder which passes through a 60 mesh screen or a 40 mesh screen, the fibrous natural product obtained therefrom tends to be a less soft fibrous product having a lower water absorption characteristic.

It is to be understood, therefore, that ground outer seed coat material to be used as starting material in this process may vary over a broad range of particle sizes and the particular range of particle size chosen to be used will be dependent upon the type of fibrous natural product required. Thus, for example, ground outer seed coat material to be used as starting material may have particle sizes such that it may pass through any screen from about 20 mesh size to about 150 mesh size. Thus, different sizes of ground outer seed coat material to be used in this process may be (a) passes through 150 mesh screen, (b) passes through 100 mesh screen, (c) passes through 20 mesh screen but remains on a 150 mesh screen, (d) passes through a 30 to 60 mesh screen, preferably a 40 mesh screen, but remains on a 150 mesh screen, (e) passes through a 60 mesh screen but remains on an 80 mesh screen, and (f) passes through a 20 mesh screen but remains on a 60 mesh screen.

Any oversized or too large particle size of ground outer seed coat material which is considered to be unsuitable for the process of this invention recycled and returned to the grinder for regrinding to smaller particle size.

A conveniently sized ground outer seed coat material may be a powder passing through a 20 to 60 mesh screen (840 to 250 microns) and remaining on a 150 mesh screen (104 microns) or it may be a powder passing through a 50 mesh screen (297 microns) and remaining on an 80 mesh screen (177 microns).

According to the process of this invention, the ground outer seed coat material is mixed with an excess of water to provide an aqueous slurry which is agitated to dissolve components, such as proteins and sugars, present in the ground material. The aqueous slurry used may be of the order of from about 2% to about 20% by weight of solid, preferably from about 2% to about 10% by weight of solid, and particularly from about 5% to about 6% by weight of solid, according to equipment available.

The slurry may be agitated at a temperature of from about 5° C. to about 40° C., preferably from about 15° C. to about 25° C., more particularly at about 20° C., and for a period of from about 2 minutes to about 10 minutes, preferably for from about 6 to about 8 minutes. It is desirable to avoid agitation of the slurry for too long a period in order to avoid dissolving certain soluble components present in the fibrous material such as pectins or gums.

It is also desirable to maintain the aqueous slurry at a pH below about 8.5 and preferably below about 7.0. The slurry tends to become darker coloured on increasing the pH and it is therefore particularly useful to maintain the pH within the range of from about 6.0 to about 6.5 when the slurry contains ground outer seed coat material from green or yellow peas. The pH of the slurry may be adjusted, if desired, by the addition of an appropriate amount of a weak acid such as citric acid or phosphoric acid to maintain a pH range of from about 6.0 to about 6.5.

When agitation of the aqueous slurry is complete, the slurry is then filtered. A vibratory type screen may be used which may have a 325 mesh screen and the solid moist cake retained by the filter is then dried. Drying may be effectively carried out by passing the solid moist cake to a suitable drier such as a flash type (forced air) drier. The dried material thus obtained is a fibrous product which may have a moisture content of about 8% with a particle size of from about 150 mesh to about 30 to 50 mesh. In certain circumstances, it may be desirable to reduce the particle size to a maximum of 80 mesh size (177 microns) to reduce the apparent texture of the fibrous product. The dried powder may therefore be subjected to further grinding, for example, by use of an air swept pulverizer. The product thus obtained may then be screened over an 80 mesh screen using vibratory or centrifugal type sifters to produce a fairly uniform product in the form of a powder. This powder is a fibrous natural product which we have named as concentrated pea bran in view of its preparation from the outer seed coat of pea seeds.

As a further valuable feature of the invention we have found that an additional processing stage may be included to provide an alternative type of novel fibrous natural product which may be desired for certain uses as an additive to food products. Thus, after the initial agitation of the aqueous slurry and filtering to remove the aqueous filtrate containing soluble products, the residual moist solid cake may then be reslurried in water and subjected to an oxidation or bleaching treatment.

This second slurry may conveniently be a 2% to 20% by weight slurry in water, preferably from about 2% to about 10% by weight slurry in water, and more particularly, from about 5% to about 6% by weight slurry in water.

As a suitable oxidizing or bleaching agent there may be mentioned hydrogen peroxide or an alkali metal hypochlorite, such as sodium hypochlorite. The oxidizing or bleaching agent may be used at a concentration of from about 100 parts to about 200 parts per million (ppm). A preferred oxidizing or bleaching agent is hydrogen peroxide used at a concentration of about 100 ppm. Other oxidizing or bleaching agents which may be used are, for example, an alkali metal sulphite or bisulphite such as sodium sulphite or sodium bisulphite, and sulphur dioxide. Treatment of the aqueous slurry with an oxidizing or bleaching agent may be carried out at a temperature of from about 15° C. to about 30° C., preferably from about 20° C. to about 25° C. with a residence time which may be from about 5 minutes to about 30 minutes. It is desirable to avoid too long a residence time because the aqueous slurry may tend to thicken. A preferred oxidizing or bleaching treatment involves agitating the slurry at about 25° C. for about 5 minutes.

As indicated above, it is desirable that the aqueous slurry be maintained at a pH below about 8.5 and preferably below about 7.0. A particularly useful pH is within the range of from about 6.0 to about 6.5 where using an aqueous slurry prepared from the outer seed coat of green or yellow peas. Such a pH may be achieved by the addition of a weak acid such as citric acid or phosphoric acid to the aqueous slurry.

When the oxidizing or bleaching treatment is complete, the aqueous slurry is filtered, conveniently by use of a centrifuge, such as a decanter centrifuge. The moist solid cake thus obtained is then dried, for example, by means of a flash type (forced air) drier. The product obtained generally has particle sizes of the order of from about 150 mesh to about 30 to 60 mesh.

When it is desired to reduce the particle size to obtain a more uniform size of product, the dried material may be ground by using, for example, an air swept pulverizer. This grinding produces a powder which may then be screened over 80 mesh screens (177 microns) using vibratory or centrifugal type sifters. The generally uniform powdered product is a novel fibrous natural product which we describe as a concentrated pea bran and which is useful as an additive in a variety of food products where natural fibre is required.

The invention is illustrated by, but not limited by, the following Examples describing the process and the products of the invention.

EXAMPLE 1

One thousand pounds of cleaned outer seed coat from yellow field peas are ground in a Jacobson hammer mill equipped with air conveyance for product removal. The powder is sifted across a 150 mesh screen using a Kason centrifugal sifter. The fine fraction passing through the 150 mesh screen is a variety of pea flour with a protein content of approximately 22% and a crude fibre content of approximately 11%. The fine pea flour amounts to approximately 170 pounds. This pea flour is subjected to a process as described at the end of this Example.

The remaining powder retained on 150 mesh is sifted over a 40 mesh screen in a similar type of rotary or centrifugal sifter. The material that passes through 40 mesh is gathered for further processing. The material retained on 40 mesh is returned to the grinder or hammer mill for further size reduction. Approximately 750 pounds of material passes through the 40 mesh and 80 pounds is recycled to the grinder.

The 750 pounds of powder passing through the 40 mesh screen is mixed with 14,250 pounds of water to form a slurry in water containing 5% w/w solids. This slurry, having a pH of 6.8, is agitated and held for an average residence time of 7 minutes at a temperature of 20° C.

The slurry is then pumped to a Sweco brand vibratory screen fitted with a 325 mesh screen. Dissolved components are washed through the screen while the fibre fraction is collected as a solid wet filter cake. This solid cake of fibrous material weighs about 3,000 pounds and has a solids content of approximately 20%, i.e., it contains about 600 pounds of solid material.

The solid cake is passed to a flash type (forced air) drier. The solid cake is dried to a moisture content of 8% and then ground in an air swept pulverizer. The moisture content is thereby reduced to 5% and the powder is then sifted over a Kason type centrifugal sifter with an 80 mesh screen. The oversized particles are recirculated to the feed entry to the flash type (forced air) drier where they provide some additional friability to the new feed cake entering the drier. The 550 pounds of powder that passes through the 80 mesh screen is a novel fibrous natural product which we describe as "concentrated pea bran" and which is useful as an additive to a variety of food products.

The pea flour (approximately 170 pounds) is formed into an aqueous 5% w/w slurry and subjected to a similar type of treatment as indicated above. There is thus obtained a fibrous natural product (80 to 100 pounds) as a dried powdered product which is a concentrated pea bran.

EXAMPLE 2

The process of Example 1 is repeated to the stage where there is obtained the solid wet cake of washed fibre weighing about 3,000 pounds and having a solids content of approximately 20%. An additional processing stage is then carried out as follows:

This washed fibrous material weighing about 3,000 pounds and containing about 600 pounds of solid material is added to 3,000 pounds of water containing phosphoric acid to provide a slurry of about 10% w/w having a pH of 6.5. To this slurry is added 100 parts per million (ppm) of hydrogen peroxide and the slurry is agitated and maintained at 25° C. for 5 minutes. The slurry is then centrifuged in a Sharples decanter centrifuge. The liquid supernatant is stored for future use at the beginning of this process and the 1,375 pounds of solid cake having a solids content of 40% is passed to a flash type (forced air) drier.

The solid cake is dried to a moisture content of 8% and then ground in an air swept pulverizer. The moisture content is thereby reduced to 5% and the powder is then sifted over a Kason type centrifugal sifter with an 80 mesh screen. The oversized particles are recirculated to the feed entry to the flash type (forced air) drier where they provide some additional friability to the new feed cake entering the drier. The 550 pounds of powder that passes through the 80 mesh screen is a novel fibrous product which we describe as "concentrated pea bran" and which is useful as an additive to a variety of food products.

The embodiments of the invention in which an exclusive property or privilege is claimed are defined as follows:

1. A process for the preparation of a novel improved fibrous natural product which comprises agitating an aqueous slurry of ground solid material from the outer seed coat of a legume for only a period of time required to dissolve water-soluble proteins and sugars present in the solid material while retaining in the solid material pectins or gums present in the solid material, filtering said slurry to remove solid product containing said pectins or gums from said slurry, and drying the solid product containing said pectins or gums to provide a novel fibrous natural product containing said pectins or gums.

2. A process for the preparation of a novel improved fibrous natural product which comprises grinding solid material from the outer seed coat of a legume to a requisite particle size, forming an aqueous slurry of the ground material and agitating said slurry for only a period of time required to dissolve water-soluble proteins and sugars present in the solid material while retaining pectins or gums present in the solid material, filtering said slurry to remove solid product containing said pectins or gums from said slurry, and drying the solid product containing said pectins or gums to provide a novel fibrous natural product containing said pectins or gums.

3. A process for the preparation of a novel improved fibrous natural product which comprises agitating an aqueous slurry of ground material from the outer seed coat of a legume for only a period of time required to dissolve water-soluble proteins and sugars present in the solid material while retaining in the solid material pectins or gums present in the solid material, filtering said slurry to remove solid material containing said pectins or gums from said slurry, suspending the solid material containing said pectins or gums in water to form a second aqueous slurry and treating said second slurry with an oxidizing or bleaching agent to oxidize or bleach the solid material while retaining in the solid material said pectins or gums, filtering said second slurry to remove solid product containing said pectins or gums from said second slurry, and drying the solid product containing said pectins or gums to provide a novel fibrous natural product containing said pectins or gums.

4. The process of claim 1, wherein the outer seed coat material is obtained from yellow or green field peas.

5. The process of claim 1, wherein the legume hull material is obtained from white beans, navy beans or soya beans.

6. The process of claim 1, wherein the outer seed coat material has a particle size which passes through a 30 to 60 mesh screen but does not pass through a 150 mesh screen.

7. The process of claim 1, wherein the outer seed coat material has a particle size which passes through a 40 mesh screen but does not pass through a 150 mesh screen.

8. The process of claim 1, wherein the outer seed coat material has a particle size which passes through a 60 mesh screen but does not pass through an 80 mesh screen.

9. The process of claim 1, wherein the slurry contains from about 2% to about 20% by weight of solid.

10. The process of claim 1, wherein the slurry contains from about 2% to about 10% by weight of solid.

11. The process of claim 1, wherein the slurry contains about 5% by weight of solid.

12. The process of claim 1, wherein the slurry is agitated at a temperature of from about 5° C. to about 40° C.

13. The process of claim 1, wherein the slurry is agitated at a temperature of from about 15° C. to about 25° C.

14. The process of claim 1, wherein the slurry is agitated at a temperature of about 20° C.

15. The process of claim 1, wherein the slurry is agitated for a period of from about 2 minutes to about 10 minutes.

16. The process of claim 1, wherein the slurry is agitated for a period of from about 6 minutes to about 8 minutes.

17. The process of claim 1, wherein the slurry is agitated at a temperature of about 20° C. for a period of from about 6 minutes to about 8 minutes.

18. The process of claim 1, wherein the slurry is maintained at a pH of from about 6.0 to about 6.5.

19. The process of claim 1, wherein the slurry is maintained at a pH of from about 6.0 to about 6.5 by the addition of citric acid or phosphoric acid.

20. The process of claim 3 wherein the second slurry contains from about 5% to about 20% by weight of solid.

21. The process of claim 3 wherein the second slurry contains about 10% by weight of solid.

22. The process of claim 3, wherein the oxidizing or bleaching agent is an alkali metal hypochlorite, an alkali metal sulphite or an alkali metal bisulphite.

23. The process of claim 3, wherein the oxidizing or bleaching agent is sodium hypochlorite, sodium sulphite or sodium bisulphite.

24. The process of claim 3, wherein the oxidizing or bleaching agent is sulphur dioxide.

25. The process of claim 3, wherein the oxidizing or bleaching agent is hydrogen peroxide.

26. The process of claim 3, wherein the oxidizing or bleaching agent is used at a concentration of from about 100 parts to about 200 parts per million (ppm).

27. The process of claim 3, wherein the oxidizing or bleaching agent is used at a concentration of about 100 ppm.

28. The process of claim 3, wherein the oxidizing or bleaching agent is hydrogen peroxide which is used at a concentration of about 100 ppm.

29. The process of claim 3, wherein the oxidizing or bleaching is carried out at a temperature of from about 15° C. to about 30° C.

30. The process of claim 3, wherein the oxidizing or bleaching is carried out at a temperature of from about 20° C. to about 25° C.

31. The process of claim 3, wherein the oxidizing or bleaching is carried out at a temperature of about 25° C. for a period of about 5 minutes.

32. The process of claim 1, wherein the fibrous natural product is dried by means of a flash type (forced air) drier.

33. The process of claim 1, wherein the fibrous natural product is ground to a powder having a particle size which passes through a 30 to 50 mesh screen but does not pass through a 150 mesh screen.

34. The process of claim 1, wherein the fibrous natural product is ground to a powder having a particle size which passes through an 80 mesh screen.

35. A process for the preparation of a novel improved fibrous natural product which comprises grinding material from the outer seed coat of a legume to a particle size which passes through a 20 mesh screen but does not pass through a 60 mesh screen, forming a 5% w/w aqueous slurry of the ground material and agitating said slurry at a temperature of about 20° C. for a period of from about 6 to about 8 minutes to dissolve water-soluble products, filtering said slurry through a 325 mesh screen, suspending the solid material in water to form a 10% w/w second slurry, treating said second slurry with 100 ppm of hydrogen peroxide at a temperature of about 25° C. for a period of about 5 minutes, filtering said second slurry and drying the solid product to provide a fibrous product.

36. The process of claim 35 wherein the legume is yellow or green field peas.

37. The process of claim 35 wherein the fibrous product is ground to a powder having a particle size which passes through an 80 mesh screen.

38. A novel fibrous natural product, when prepared by the process of claim 1.

39. A novel fibrous natural product, when prepared by the process of claim 3.

40. A process for the preparation of a fibrous product which comprises grinding material from the outer seed coat of a legume to a particle size which passes through a 20 mesh screen but does not pass through a 150 mesh screen, forming an aqueous slurry of the ground material and agitating said slurry at a temperature of about 5°–40° C. for a period of from about 2 to about 10 minutes to dissolve water-soluble proteins and sugars present in the material while retaining pectins or gums present in the material, filtering said slurry to remove solid product from said slurry, and drying the solid product to provide a fibrous product.

* * * * *

UNITED STATES PATENT AND TRADEMARK OFFICE
CERTIFICATE OF CORRECTION

PATENT NO. : 4,774,096

DATED : September 27, 1988

INVENTOR(S) : GARY B. NICKEL

It is certified that error appears in the above-identified patent and that said Letters Patent is hereby corrected as shown below:

Front Page, first column [56], between lines 3 and 4 insert -- 4,237,170 12/80 Satin ......... 426/21 --;

Front Page, line 1, second column, [57], after "a" insert therefor -- novel improved --;

line 4, delete "only";

line 5, delete "protein and sugar";

Column 1, line 15, after "Standard" delete ")";

line 38, delete "outerseed" and insert therefor -- outer seed --;

Column 3, line 10, after "The" insert therefor -- finer the particle size of the powder, i.e., ground outer --;

line 43, after "invention" insert therefor -- may be --;

UNITED STATES PATENT AND TRADEMARK OFFICE
CERTIFICATE OF CORRECTION

PATENT NO. : 4,774,096

DATED : September 27, 1988

INVENTOR(S) : GARY B. NICKEL

It is certified that error appears in the above-identified patent and that said Letters Patent is hereby corrected as shown below:

Column 7, line 7, after "ground" insert therefor -- solid --.

Signed and Sealed this

Sixteenth Day of April, 1991

Attest:

HARRY F. MANBECK, JR.

Attesting Officer

Commissioner of Patents and Trademarks